United States Patent Office 2,763,910
Patented Sept. 25, 1956

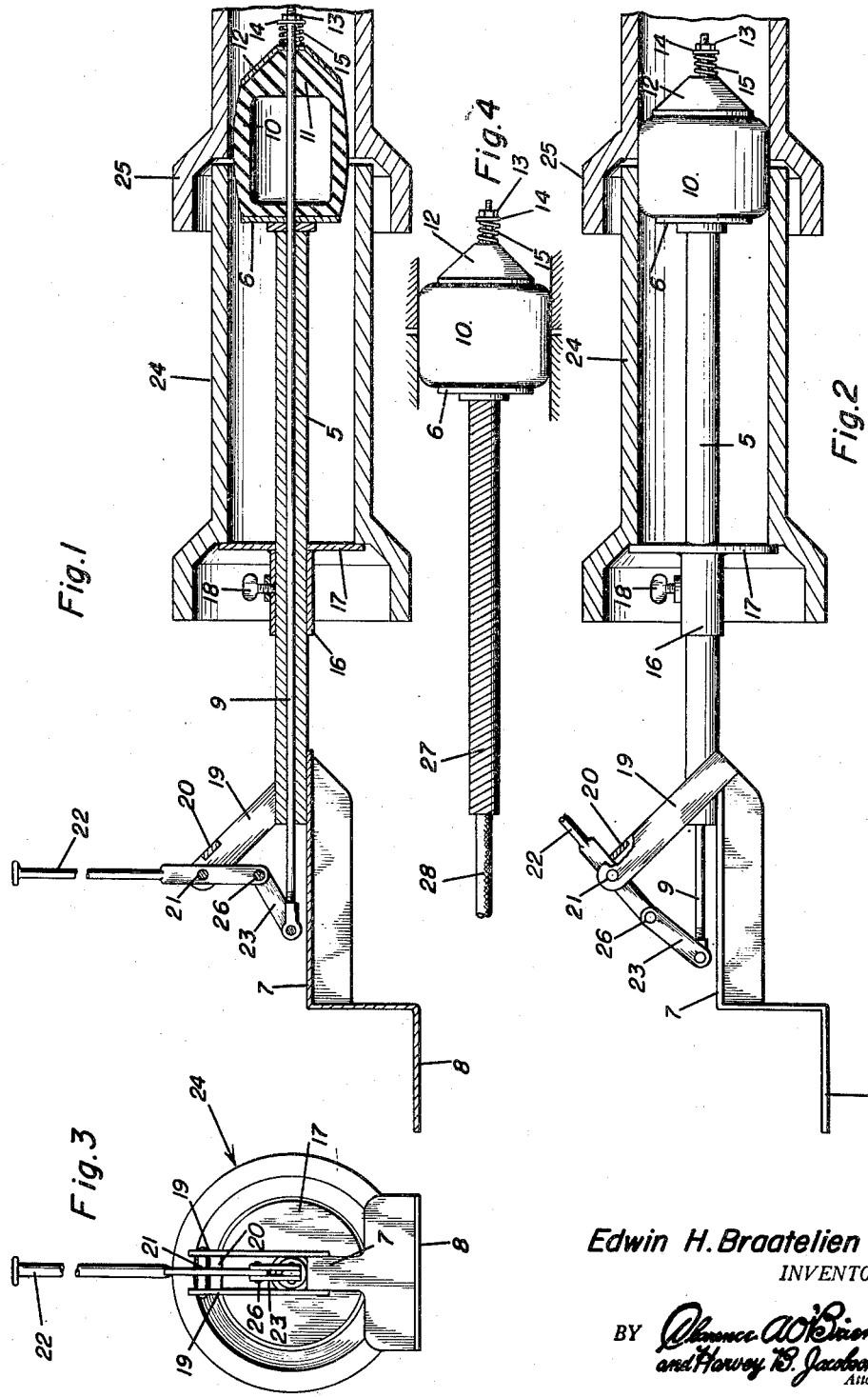
Edwin H. Braatelien
INVENTOR.

2,763,910

PIPE JOINT SEALER

Edwin H. Braatelien, Phoenix, Ariz.

Application December 22, 1953, Serial No. 399,725

1 Claim. (Cl. 25—127)

The present invention relates to the art of spigot pipe laying and has for its primary object to provide, in a manner as hereinafter set forth, a device comprising a novel construction and arrangement of parts whereby the entire joints of pipe of this type may be expeditiously and completely filled with joining compound, obviating the use of yarn in the operation.

Another very important object of the invention is to provide, in a device of the aforementioned character comprising an expansible joint sealing plug or member, novel means for expanding said plug or member into sealing engagement with the joint.

Other objects of the invention are to provide a pipe joint sealer which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in vertical longitudinal section, showing the device in position in a spigot pipe line but with the expansible plug contracted;

Figure 2 is a view substantially similar to Figure 1 but showing the device in side elevation with the plug expanded;

Figure 3 is an end elevational view; and

Figure 4 is an elevational view showing a modification.

Referring now to the drawing in detail, it will be seen that the embodiment of the invention which has been illustrated comprises a metallic tube 5 of suitable length and diameter. Mounted on the forward end of the tube 5 is a metallic disc 6. Fixed beneath the rear end portion of the tube 5 and extending rearwardly therefrom is a bracket 7 comprising a downwardly offset, rearwardly projecting foot plate 8.

Mounted for reciprocation in the tube 5 and projecting beyond the ends thereof is a rod 9. The rod 9 extends slidably through the disc 6 and has mounted on its forward end portion an expansible hollow plug or body 10 of rubber or other suitable material. As shown to advantage in Figure 1 of the drawings, the resilient plug 10, when contracted, is substantially bulbous and the rear end thereof abuts the disc 6. It may be well to here state that the rod 9 is slidable in the plug 10. The plug 10, in the embodiment shown, comprises a substantially conical forward end portion 11 which is engaged in a metallic cup or plate 12 on the rod 9. A retaining nut 13 is threaded on the forward end portion of the rod 9 behind a washer 14. Interposed between the elements 12 and 14 is a coil spring 15.

Mounted for sliding adjustment on the tube 5 is a sleeve 16. A circular gauge 17 is fixed on the forward end of the sleeve 16. A set screw 18 secures the sleeve 16 in adjusted position on the tube 5.

Fixed on the adjacent portions of the tube 5 and the bracket 7 is a pair of spaced, upwardly and rearwardly inclined arms 19. A bar 20 extends between the upper portions of the arms 19. Pivotally secured, as at 21, between the upper end portions of the arms 19 is a hand lever 22. Links 23 operatively connect the pivoted end portion of the lever 22 to the rear end of the rod 9.

It is thought that the operation of the device will be readily apparent from a consideration of the foregoing. Briefly, the plug 10 is inserted longitudinally in the pipe line 24 to the joint 25 to be sealed. This is facilitated by the adjustable gauge plate 17 on the tube 5, which gauge plate is engageable in the open end of the pipe. With one foot on the plate 8, the operator now swings the lever 22 forwardly from the position shown in Figure 1 of the drawing to that illusrated in Figure 2 of said drawing. In this manner the rod 9 is forced rearwardly in the tube 5 for longitudinally compressing and radially expanding the resilient plug 10 into sealing contact with the joint 25. Of course, the plug 10 is compressed between the elements 6 and 12. The coil spring 15 provides a yielding connection between the rod 9 and the plug. When the pivotal connection 26 between the lever 22 and the links 23 passes dead center said lever comes to rest against the bar 20 which thus constitutes a stop. The complete joint 25 may now be filled with joining compound, after which the device is removed by swinging the hand lever 22 rearwardly thereby returning the rod 9 to its forward position for permitting the plug 10 to contract.

The modification shown in Figure 4 of the drawing comprises a bendable tube 27 in the form of a metallic coil of sufficient resiliency to readily negotiate bends or angles in the pipe. Toward this end, a resilient rod or cable 28 extends slidably through the tube 27 and has one end operatively connected to the lever 22. The elements 6, 10, etc., are mounted on the forward ends of the members 27 and 28. In other respects the modification of Figure 4 is substantially similar in construction and operation to the embodiment of Figures 1, 2 and 3 of the drawing.

It is believed that the many advantages of a pipe joint sealer constructed in accordance with the present invention will be readily understood and although preferred embodiments of the device are as illustrated and described, it is to be understood that changes of the details of construction may be resorted to which will fall within the scope of the invention as claimed.

What is claimed as new is as follows:

A pipe joint sealer of the character described comprising a tube for longitudinal insertion in a pipe line, a rod mounted for reciprocation in the tube and projecting beyond the ends thereof, a longitudinally compressible, radially expansible resilient plug mounted on one end portion of said rod and adapted for sealing engagement with the joint in the pipe line, coacting means on the tube and rod for expanding the plug, a lever pivotally mounted on the tube and operatively connected to the other end portion of the rod, a bracket mounted on the tube adjacent the lever, and a ground engaging foot plate on the bracket for anchoring the tube against longitudinal movement.

References Cited in the file of this patent

UNITED STATES PATENTS

| 423,128 | Christoffel | Mar. 11, 1890 |
| 753,464 | Beinhauer | Mar. 1, 1904 |
| 1,150,487 | Berry | Aug. 17, 1915 |
| 1,636,243 | Rasmussen | July 19, 1927 |
| 2,029,147 | Anderson | Jan. 28, 1936 |
| 2,170,866 | McAllister | Aug. 29, 1939 |
| 2,607,370 | Anderson | Aug. 19, 1952 |

FOREIGN PATENTS

| 360,146 | Great Britain | Nov. 5, 1931 |
| 814,366 | Germany | Sept. 20, 1951 |